US011878707B2

(12) United States Patent
Lu et al.

(10) Patent No.: US 11,878,707 B2
(45) Date of Patent: Jan. 23, 2024

(54) AUGMENTED REALITY OVERLAY BASED ON SELF-DRIVING MODE

(71) Applicant: International Business Machines Corporation, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 42 days.

(21) Appl. No.: 17/692,551

(22) Filed: Mar. 11, 2022

(65) Prior Publication Data
US 2023/0286524 A1    Sep. 14, 2023

(51) Int. Cl.
*B60W 50/14*    (2020.01)
*B60W 40/08*    (2012.01)
(Continued)

(52) U.S. Cl.
CPC .............. *B60W 50/14* (2013.01); *B60K 35/00* (2013.01); *B60W 40/08* (2013.01);
(Continued)

(58) Field of Classification Search
CPC .............. B60W 50/14; B60W 60/0015; B60W 40/08; B60W 2540/043; B60W 2556/10; B60W 2540/229; B60W 2040/0818; B60W 2050/146; B60K 35/00; B60K 2370/195; B60K 2370/177; B60K 2370/175
See application file for complete search history.

(56) References Cited

U.S. PATENT DOCUMENTS 6,356,812 B1 *   3/2002   Cragun ................. G01C 21/36
                                                         701/1
8,750,602 B2     6/2014   Li
(Continued)

OTHER PUBLICATIONS

"Automotive OEM's", COPYRIGHT © 2021 Autodrive Technologies, 9 pages, <https://www.autodrivetech.com/solutions/automotive-oems/>.
(Continued)

*Primary Examiner* — Chico A Foxx
(74) *Attorney, Agent, or Firm* — Daniel M. Yeates (57) ABSTRACT

A computer-implemented method displays a media file below a distraction threshold. The method includes identifying a driver of a vehicle, where the vehicle includes an augmented reality system, and the vehicle is at least partially automated. The method also includes determining, a driving mode for the vehicle and calculating a focus score. The method includes requesting, from a media repository, a media file, where the media repository contains a plurality of media files, and each media file has an associated distractions score. The method includes receiving from the media repository, a first media file to display, where a first distraction score of the first media file combined with the focus score is below a safety threshold. The method also includes displaying the first media file by the AR system. Further aspects of the present disclosure are directed to computer program products containing functionality consistent with the method described above.

20 Claims, 6 Drawing Sheets

(51) Int. Cl.
   *B60W 60/00*           (2020.01)
   *B60K 35/00*           (2006.01)
(52) U.S. Cl.
   CPC .............. *B60W 60/0015* (2020.02); *B60K 2370/175* (2019.05); *B60K 2370/177* (2019.05); *B60K 2370/195* (2019.05); *B60W 2040/0818* (2013.01); *B60W 2050/146* (2013.01); *B60W 2540/043* (2020.02); *B60W 2540/229* (2020.02); *B60W 2556/10* (2020.02)

(56) References Cited

U.S. PATENT DOCUMENTS

| | | | |
|---|---|---|---|
| 8,965,621 B1 | 2/2015 | Urmson | |
| 9,878,663 B1* | 1/2018 | Kochura | B60W 40/08 |
| 10,095,228 B1 | 10/2018 | Kuffner, Jr. | |
| 10,323,952 B2* | 6/2019 | Li | G06V 20/56 |
| 10,908,677 B2* | 2/2021 | Upmanue | H04N 23/54 |
| 10,913,464 B1* | 2/2021 | Qiao | B60W 50/14 |
| 2003/0174047 A1* | 9/2003 | Ohmura | G01C 21/3626 348/E7.071 |
| 2008/0060497 A1* | 3/2008 | Lambert | G01B 7/003 84/307 |
| 2008/0185207 A1* | 8/2008 | Kondoh | B60W 30/16 180/272 |
| 2008/0236929 A1* | 10/2008 | Fukaya | B60T 7/22 707/999.107 |
| 2012/0259695 A1 | 10/2012 | Glassman | |
| 2012/0271484 A1* | 10/2012 | Feit | B60W 40/04 701/1 |
| 2013/0238190 A1* | 9/2013 | Yasuda | G01C 21/36 701/36 |
| 2014/0313333 A1* | 10/2014 | Le | B60R 16/0231 348/148 |
| 2015/0367770 A1* | 12/2015 | Newton-Dunn | H04W 4/14 340/438 |
| 2016/0001781 A1* | 1/2016 | Fung | G07C 9/37 701/36 |
| 2016/0167671 A1* | 6/2016 | Offenhaeuser | B62D 15/025 340/576 |
| 2016/0221502 A1* | 8/2016 | Gordon | G06V 20/597 |
| 2017/0021837 A1* | 1/2017 | Ebina | B60K 28/06 |
| 2017/0043781 A1* | 2/2017 | Prakah-Asante | B60W 40/08 |
| 2017/0203688 A1* | 7/2017 | Kuwahara | B60Q 9/00 |
| 2018/0032891 A1* | 2/2018 | Ba | B60W 50/14 |
| 2018/0157980 A1* | 6/2018 | Kochura | G06N 5/048 |
| 2018/0215395 A1* | 8/2018 | Keany | G06F 18/22 |
| 2018/0220948 A1* | 8/2018 | Kojima | A61B 5/7246 |
| 2019/0143995 A1* | 5/2019 | Aizawa | H04N 21/4524 340/576 |
| 2019/0147275 A1* | 5/2019 | Matsuura | B60W 50/14 348/148 |
| 2019/0196679 A1* | 6/2019 | You | G06F 3/0484 |
| 2019/0213429 A1* | 7/2019 | Sicconi | G06F 3/012 |
| 2019/0213976 A1* | 7/2019 | Rakshit | B60K 37/02 |
| 2019/0318180 A1* | 10/2019 | Mudalige | G06V 30/226 |
| 2019/0370580 A1* | 12/2019 | Aoi | G06V 10/454 |
| 2019/0389455 A1* | 12/2019 | Reed | G06V 20/58 |
| 2020/0057487 A1* | 2/2020 | Sicconi | G06T 7/254 |
| 2020/0118172 A1 | 4/2020 | Jaegal | |
| 2020/0160714 A1* | 5/2020 | Inaba | G08G 1/166 |
| 2020/0241824 A1* | 7/2020 | Lee | G06F 3/1423 |
| 2021/0287253 A1 | 9/2021 | Yasui | |
| 2021/0306421 A1* | 9/2021 | Biswas | H04L 67/146 |
| 2021/0349977 A1* | 11/2021 | Kishikawa | H04W 12/122 |
| 2021/0370954 A1* | 12/2021 | Alvarez | H04W 4/02 |
| 2022/0019829 A1* | 1/2022 | Tal | H04N 7/181 |
| 2022/0111851 A1* | 4/2022 | An | B60W 50/14 |
| 2022/0204035 A1* | 6/2022 | MacKenzie | B60W 60/0059 |
| 2023/0066670 A1* | 3/2023 | Yasuda | G06V 40/18 |

OTHER PUBLICATIONS

"BMW Head Up Display: How It Works and What Information Can You See", Downloaded Dec. 7, 2021, 12 pages, <https://www.bmwux.com/bmw-performance-technology/bmw-technology/bmw-head-up-display-explained/>.

"Disruptive automotive technology solutions", IBM, Downloaded Dec. 7, 2021, 9 pages, <https://www.ibm.com/industries/automotive>.

"IBM Watson is AI for smarter business", Downloaded Dec. 7, 2021, 9 pages, <https://www.ibm.com/watson>.

"Internet of Things on IBM Cloud", Downloaded Dec. 7, 2021, 9 pages, <https://www.ibm.com/cloud/internet-of-things>.

Disclosed Anonymously, "Advertising using Augmented Reality", An IP.com Prior Art Database Technical Disclosure, IP.com No. IPCOM000251920D, IP.com Electronic Publication Date: Dec. 11, 2017, 7 pages.

Disclosed Anonymously, "Selecting Advertisements based on Driver's Attention Capacity", An IP.com Prior Art Database Technical Disclosure, IP.com No. IPCOM000217767D, IP.com Electronic Publication Date: May 11, 2012, 3 pages.

Dube et al., "Automotive industry architecture", Downloaded Dec. 7, 2021, 9 pages, <https://www.ibm.com/cloud/architecture/architectures/automotive/>.

Koederitz et al., "Automotive companies with the insights to understand the future will be the ones that can shape it", © 2018 IBM Corporation, 10 pages, <https://www.ibm.com/services/us/gbs/thoughtleadership/giaauto/>.

Mell et al., "The NIST Definition of Cloud Computing", Recommendations of the National Institute of Standards and Technology, Special Publication 800-145, Sep. 2011, 7 pages.

Stanley et al., "Automotive enterprises must adapt to how consumers can access vehicles in new ways—and how cars fit into complex transportation options", Downloaded Dec. 7, 2021, 7 pages, <https://www.ibm.com/thought-leadership/institute-business-value/report/auto2025>.

Winkelmann, Holger, "Driving innovation for connected cars using IBM Cloud", Feb. 4, 2020, 8 pages, <https://www.ibm.com/blogs/cloud-computing/2020/02/04/driving-innovation-connected-cars-ibm-cloud/>.

Woods, Killian, "'Did you see that billboard, or was it just me': The personalised future of advertising", Jan. 13, 2019, 6 pages, <https://www.thejournal.ie/future-of-advertising-marketing-4430555-Jan 2019/>.

\* cited by examiner

AUGMENTED REALITY OVERLAY BASED ON SELF-DRIVING MODE

BACKGROUND

The present disclosure relates to automated vehicles, and, more specifically, altering augmented reality overlays based on self-driving mode.

Many modern vehicles have several modes/levels of automation. These can range from no automation or fully manual where a driver performs all tasks related to driving, through partially automated, where the driver performs some of the tasks, to fully automated, where the driver performs almost no tasks related to driving.

SUMMARY

Disclosed is a computer-implemented method to display a media file below a distraction threshold. The method includes identifying a driver of a vehicle, wherein the vehicle includes an augmented reality (AR) system, and the vehicle is at least partially automated. The method also includes determining, a driving mode for the vehicle. The method further includes calculating a focus score, wherein the focus score is based on the driving mode. The method includes requesting, from a media repository, a media file, wherein the media repository contains a plurality of media files, and each media file has an associated distractions score. The method further includes receiving from the media repository, a first media file to display, wherein a first distraction score of the first media file combined with the focus score is below a safety threshold. The method also includes displaying the first media file by the AR system. Further aspects of the present disclosure are directed to computer program products containing functionality consistent with the method described above. Also disclosed is a system to reduce the risk of distractions to a driver.

The system comprises a processor; and a computer-readable storage medium communicatively coupled to the processor and storing program instructions which, when executed by the processor, are configured to cause the processor to identify a driver of a vehicle, wherein the vehicle includes an augmented reality (AR) system, and the vehicle is at least partially automated. The program instructions are further configured to cause the processer to determine a driving mode for the vehicle. The program instructions are also configured to cause the processer to calculate a focus score, wherein the focus score is based on the driving mode. The program instructions are configured to cause the processer to identify a first distraction along a route the vehicle is traveling. The program instructions are further configured to cause the processer to calculate a distraction score for the first distraction, wherein the distraction score is based on a complexity of the distraction. The program instructions are also configured to cause the processer to determine the sum of the focus score and the distraction score exceed a safety threshold. The program instructions are further configured to cause the processer to reduce a risk of the first distraction.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The present disclosure relates to automated vehicles, and, more specifically, altering augmented reality overlays based on a self-driving mode.

Many modern vehicles have several modes/levels of automation. These can range from no automation or fully manual where a driver performs all tasks related to driving, to fully automated, where the driver performs almost no tasks related to driving.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
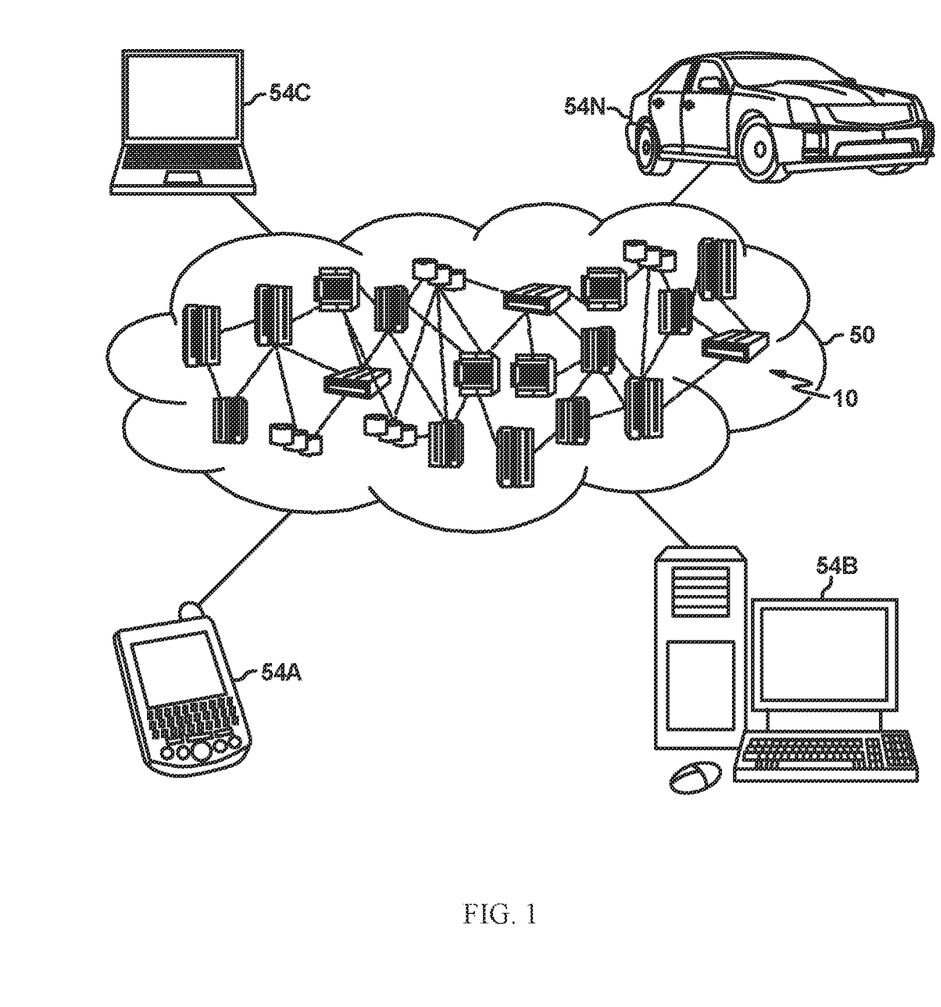
FIG. 1 depicts a cloud computing environment, according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
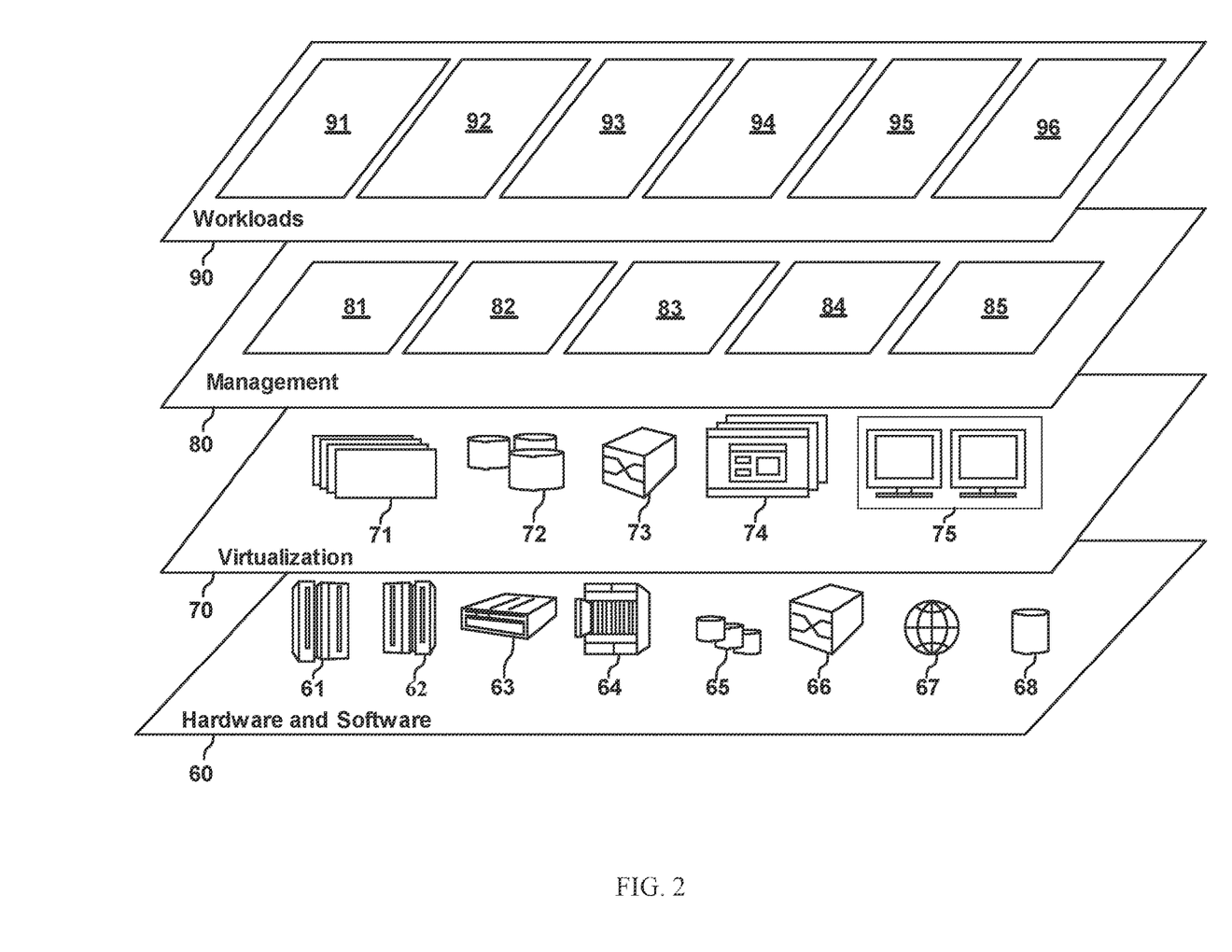
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and risk reduction 96.

Figure 3:
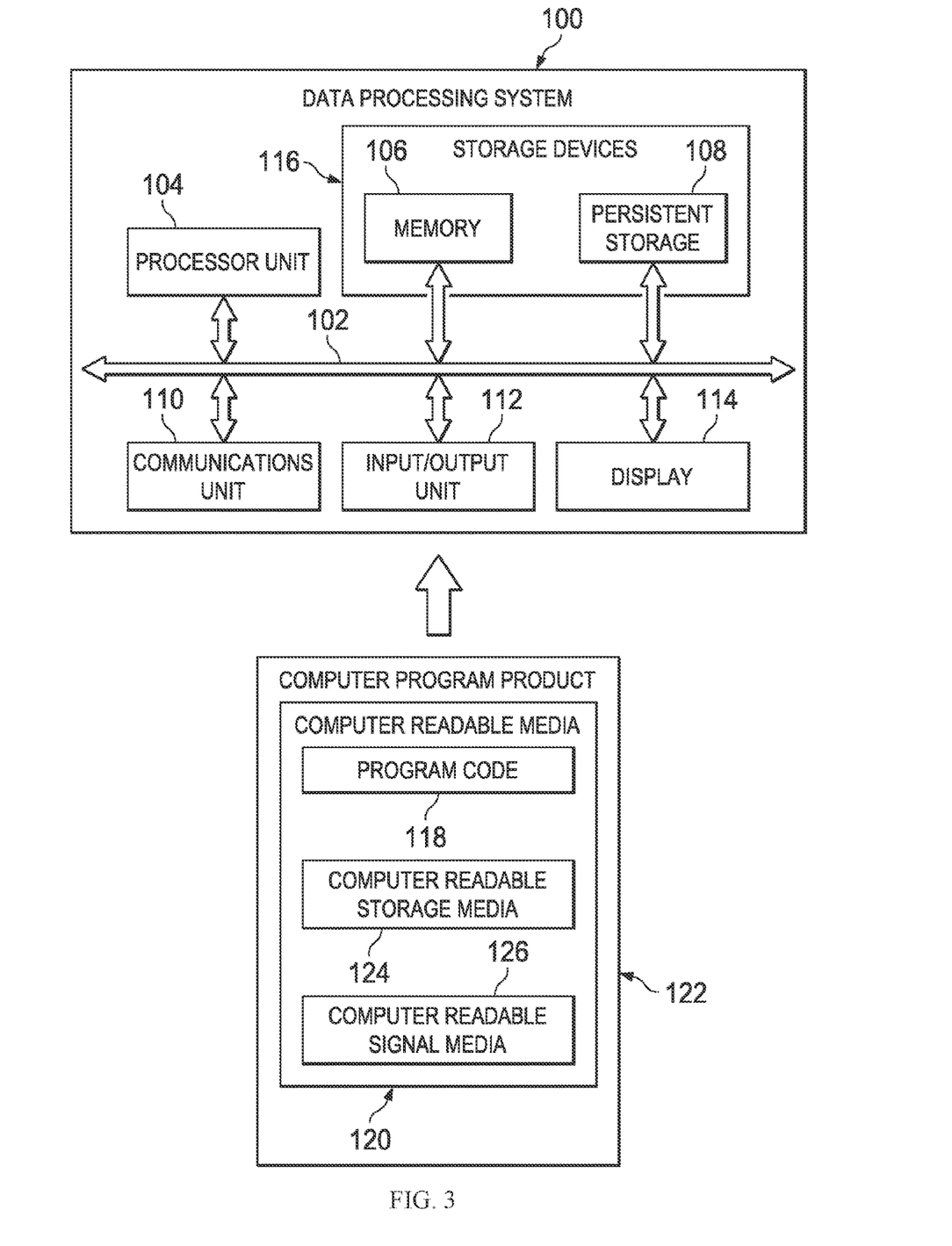
FIG. 3 is a block diagram of a data processing system (DPS), according to one or more embodiments disclosed herein.

Data Processing System in General:

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

The present disclosure relates to automated vehicles, and, more specifically, altering augmented reality overlays based on self-driving mode.

Many modern vehicles have several modes/levels of automation. These can range from no automation or fully manual where a driver performs all tasks related to driving, to partially automated, where the driver performs some of the tasks, to fully automated, where the driver performs almost no tasks related to driving. Many vehicles can switch between the various driving modes automatically and/or based actions of the driver. The amount of attention the driver needs to focus on driving can be different for the different levels of automation. Many vehicles include augmented reality (AR) features that are incorporated into the vehicles. The AR displays information and/or projects information to various compatible surfaces within the vehicle. Augmented reality can be any system that enhances/alters a user's perception on their surroundings. For example, a vehicle can include a Heads-Up Display (HUD), that can display driving directions within the field of view of the driver, so a driver does not need to look away from the road to gather the relevant information.

When a vehicle is in manual mode, the risk of a driver being distracted from driving can increase the risk of a negative event (e.g., car accident). However, the risk can be much lower relative to the same distraction when a vehicle is in a highly automated mode. For example, if a driver is driving a vehicle in manual mode and the driver looks at an advertisement for a long period of time, they are taking their concentration off the road and increasing the risk of negative event. Conversely, if the vehicle is driven in fully autonomous mode, the driver can look at the same roadside advertisement for the same amount of time with little not no increase in risk. Examples of a distractions can include roadside advertisements, displays, and/or other images/activities.

Another factor that can affect distraction/safety is the experience level of the driver. A driver with relatively low experience can be distracted, or be more likely to have a negative outcome during a small distraction, than a more experienced driver.

Embodiments of the present disclosure can limit the distractions presented to a driver, or said differently, to reduce the distraction below an acceptable level based on the automation state (e.g., manual control vs. automatic control) of a self-driving vehicle.

In some embodiments, a display manager can manager what images are presented to a driver. The display manager can cause an image (e.g., advertisement) to be displayed and/or use AR capabilities to block/blur a distraction from outside the vehicle.

In some embodiments, the display manager can identify a driver. The identification can be based on receiving an indication from the driver. In some embodiments, the identification can be based on an Internet of Things device associated with the driver. For example, a smart phone, or smart watch can indicate the driver in the vehicle. In some embodiments, identifying the driver include determining a driver experience level (or experience level). The experience level can indicate a relative amount of driving experience of a driver. In some embodiments, the experience level can be dynamic and/or static for each driver. The dynamic experience level can change based on factors that can affect/need additional concentration. Some factors can include location, weather, additional passengers, familiarity with the vehicle and location, and the like.

In some embodiments, the experience level is determined based on historical data. The historical data can include data about a driver's driving history. The historical data can be manually input and/or added to after and during each trip. The historical data can include time spend driving, type of vehicles, locations, routes, weather conditions, passengers, time of day, driving conditions (e.g., traffic), and the like.

In some embodiments, the display manager can determine the driving mode (or automation mode) of the vehicle. In some embodiments, the driving mode can be selected from a predetermined set of modes. There can be any number of predefined modes, where each mode has a set of tasks/operations the vehicle performs without the driver. In some embodiments, the driving mode can be based on the feature that are currently being used.

In some embodiments, the display manager can generate a focus score (or focus level score, or attention score, or allowed level of distraction score). The focus score can represent a relative amount of focus/attention a driver should use to safely drive the vehicle. The focus score can be based on one or more of the driving conditions, the vehicle driving mode, and the driver. As the amount of focus needed by the driver increases, the focus score also increases.

In some embodiments, the display manager can identify potential distractions. The distraction can be anything that will shift the focus of the driver away from driving to the object. In some embodiments, the distraction is a display on an interface. The display can be an advertisement, media display (e.g., music, driving directions, automobile information, etc.), and the like. In some embodiments, the display can be external to the vehicle (e.g., billboard). In some embodiments, the display can be inside the vehicle.

In some embodiments, the display manager can generate a distraction score. The distraction score can represent an estimated attention and/or the driver needs to give the display to internalize the information. The more attention and/or time needed, the higher the distraction score. As examples, a billboard with well-known simple logo can have a low distraction score, but a billboard with a lot of words and graphics can have a relatively high distraction score.

In some embodiments, the display manager can combine/add the focus score and the distraction score. The display manager can attempt to keep the combination of the scores below a threshold. The threshold can represent a total amount of concentration of a driver and, if the total is exceeded, the display manager can take action. The display manager can attempt to obscure the distraction and/or alter the driving mode of the vehicle. Altering the driving mode to a higher state of automation can lower the focus score. As such, the combination can be below the threshold.

In some embodiments, the identified distraction can be obscured by the display manager. The display manager can generate a display on a window and/or other surface to obscure a potential distraction. For example, if the distraction is on a billboard, the AR device can project a blue square to mimic the sky over the location of the sign. The projection can be of any shape and/or color configured to obscure the distraction. In some embodiments, the display is within the vehicle. The display can be simplified, and/or turned off to reduce the potential distraction. In some embodiments, the vehicle includes one more sensors to identify the potential distractions. The sensors can include cameras, head detectors, IoT devices, and the like. The sensors can be in the vehicle to capture data related to the drives (e.g., where the eyes are looking), and/or outside the vehicle to observe distractions, traffic, weather, and/or other conditions surrounding the vehicle. In some embodiments, the potential distraction is based on a trigger. The trigger can be, for example, a location (e.g., passing a billboard), amount of traffic, weather conditions, and the like.

In some embodiments, the display manager can select an advertisement/distraction to display. The display manager can be in communication with an advertising server/application. The application can have a set of adds for a plurality of distraction levels. In some embodiments, the selected advertisement has a potential distraction such that, when combined with the focus score, the threshold is not exceeded. In some embodiments, the advertisement is selected in response to the trigger being activated.

The aforementioned advantages are example advantages, and embodiments exist that can contain all, some, or none of the aforementioned advantages while remaining within the spirit and scope of the present disclosure.

Figure 4:
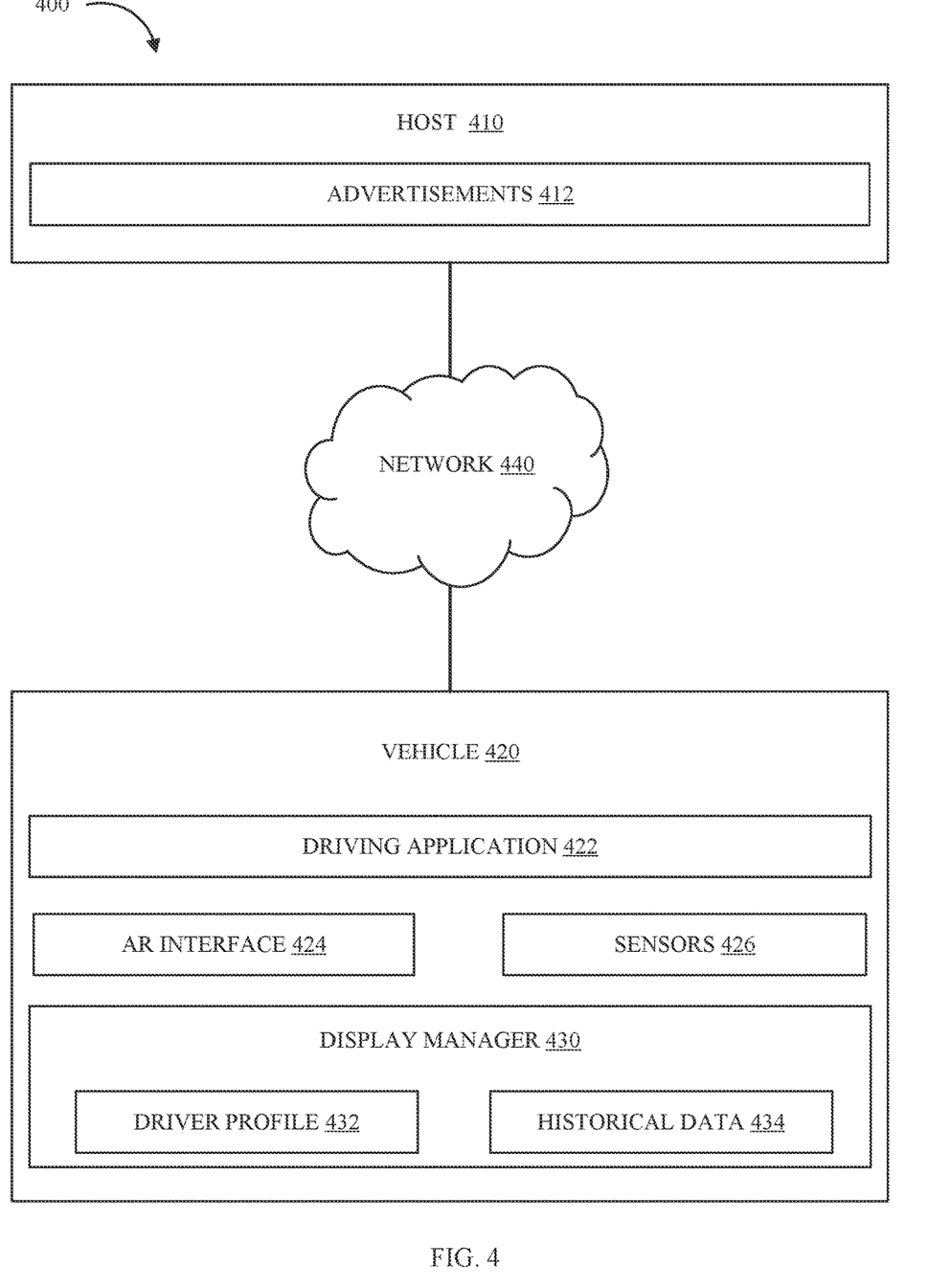
FIG. 4 illustrates a functional diagram of a computing environment suitable for operation of a display manager, in accordance with some embodiments of the present disclosure.

Referring now to various embodiments of the disclosure in more detail, FIG. 4 is a representation of a computing environment 400, that is capable of running a display manager in accordance with one or more embodiments of the present disclosure. Many modifications to the depicted environment may be made by those skilled in the art without departing from the scope of the disclosure.

Computing environment 400 includes host 410, vehicle 420, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between and among host 410, vehicle 420, and other computing devices (not shown) within computing environment 400. In some embodiments, host 410 and vehicle 420 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud environment 50). In some embodiments, host 410 includes advertisements 412.

In some embodiments, host 410 and/or any number of its subcomponents can be implemented into vehicle 420.

Advertisements 412 can include a plurality media files. In some embodiments, the files can include advertisements and/or other visual media (e.g., photos, images, etc.). The files can include still frames, videos, audio, and other similar media files. In some embodiments, each media file is associated with a complexity score and/or a distraction score. The two scores can form a single combined score. In some embodiments, the distraction score can represent the complexity of the media display. The higher the score, the more complex the media. In some embodiments, more complex media can require more attention to view and/or understand. For example, a video can be more complex than a still frame because it require viewing for a longer period of time. Another example, a display that only has a logo can be less complex than a display that has the same logo with words and/or numbers associated with the logo.

Vehicle 420 can be any vehicle. In some embodiments, vehicle 420 can be any machine that is propelled by an engine. In some embodiments, vehicle, 420 can be anything that is driven around on the ground (e.g., wheeled or unwheeled). The vehicle can be an automobile, a bicycle, an all-terrain vehicle, farm equipment, and any other type of movable machine. In some embodiments, vehicle 420 has some level of automation/self-driving capability. Each vehicle can include a computing device to manage the automation. In some embodiments, vehicle 420 includes a driving application 422, AR interface 424, sensors 426, and display manager 430.

Driving application 422 can be any combination of hardware and/or software configured to automate at least a portion of vehicle 420. The automation can be any level of automation. In some embodiments, driving application 422 can automate one or more of accelerating, decelerating, maintaining velocity, maintaining distance, steering, changing lanes, parking, and the like. In some embodiments, the driving application can manage an automated function in the vehicle unrelated to driving. This can include turning on/off attached equipment, passenger comfort actions, communications, and the like.

In some embodiments, the automobile is fully automated. When fully automated, driving application 422 performs all functions to drive the vehicle such that a passenger/driver takes no actions and vehicle 422 continues to drive without user input. In some embodiments, the level of automation is very low, such that driving application 422 can perform a single action. For example, the automation can maintain an engine at a constant revolutions per minute (RPM) and/or a constant velocity. In some embodiments, the level of automation can be any level. Any function of driving can be performed by driving application 422.

In some embodiments, driving application 422 can have preset automation levels/modes. Each level can have a set of functions that are performed by the driving application 422. The various functions are not necessarily mutually exclusive and/or additive. In some embodiments, each level builds on the next lower level by adding at least one additional function to all of the functions of the lower levels. There can be any number of predefined levels. In some embodiments, the higher the level of automation the lower the focus score all other factors being equal.

In some embodiments, the driving mode and/or level of automation can be correlated with a focus level. For example, the focus score is determined in full by the current driving mode of the vehicle. In some embodiments, the driving mode is one factor in determining the focus score. In some embodiments, the driving mode can set a minimum focus. For example, in driving mode A, the focus score must be X or higher. Factors such as weather and driver experience can cause the focus score to increase, but not to decrease.

AR interface 424 can be any combination of hardware and/or software configured to display visual information to the driver and other passengers of vehicle 420. In some embodiments, AR interface 424 can use visual, audible, and/or other computer sensory generated data to enhance perception. AR interface 424 can be overlayed on any surface (e.g., windshield, display screen, etc.) within vehicle 420. In some embodiments, AR interface 424 can accept input from one or more passengers within vehicle 420. In some embodiments, AR interface 424 can project/render advertisements within vehicle 420.

Sensors 426 can be any combination of hardware and/or software configured to gather data surrounding a vehicle 420. Vehicle 420 can include any number sensors and any number of types of sensors. In some embodiments, the type of sensor includes one or more of cameras, thermometers, heat detectors, moisture detectors, motion detections, microphones, distance detectors, and the like. The number and type of sensors can be configured to gather enough data to identify object and/or situations that can affect driving a vehicle. In some embodiments, the various sensors can be placed in various locations around the vehicle. In some embodiments, sensors 426 can be configured to identify visual displays, such as advertisements. In some embodiments, sensors 426 can be configured to identify conditions surrounding vehicle 420. The conditions can include weather conditions, traffic conditions, and the like.

Display manager 430 can be any combination of hardware and/or software configured to manage content that is displayed to a driver. In some embodiments, display manager 430 can display media to, and/or remove/obscure media from the field of view of a driver. In some embodiments, display manager 430 includes driver profile 432 and/or historical data 434.

In some embodiments, display manager 430 can generate a focus score. The focus score can be a representation of the amount of attention the driver of the vehicle should use to drive. In general, the higher the level of automation, the lower the focus score. In some embodiments, the focus score can be based on a driving mode of the vehicle, environmental factors, driver experience, traffic, and the like.

In some embodiments, display manager 430 can identify a potential distraction to the driver. In some embodiments, the potential distraction includes a visual distraction. The visual distraction can include a billboard, and/or other similar items. Display manager 430 can generate a distraction score for the potential distraction. The distraction score can be based on the complexity of the visual display, the location, driver interest, and the like. For example, if there is a billboard in line of sight with the road, that can be a low distraction, because the driver can still be viewing the road. If the billboard is off to the side, the distraction score can be relatively high because it would require the driver to move attention away from the road.

In some embodiments, display manger 430 can determine if the distraction level will exceed a threshold based on the focus score. In some embodiments, display manager 430 can compare the focus score against the distraction score. In some embodiments, the comparing is in response to identifying the distraction and/or generating the distraction score. In some embodiments, display manager 430 can combine the distraction score with a focus score. The two scores together can be compared to a threshold. The threshold can be a safety threshold. In some embodiments, display manager 430 can take action based on the safety threshold being exceeded by the combination of the scores.

In some embodiments, display manager 430 can obscure or attempt to obscure the distraction. The obscuring can be in response to determining the distraction score is greater than the focus score. In some embodiments, the obscuring can include turning off and/or changing a display. For example, if the distraction is located on a screen within vehicle 420, display manager 430 can turn the screen off and/or change to a display with a lower distraction score. In some embodiments, the obscuring includes covering the distraction with AR interface 424. AR interface 424 can project/render on a window any display to obscure a view. For example, if the distraction is a billboard on the drives side, a portion of the driver's side window can be obscured with a colored box. The box can be configured to mimic the background, such as blue box to look like the sky behind the billboard.

In some embodiments, display manager 430 can be configured to display media to the driver based on one or more triggers. The trigger can be a location (e.g., GPS), a time, distance travelled, and the like. In some embodiments, display manager 430 can generate the focus score in response to the trigger. In some embodiments, display manager 430 retrieves media to display based on the current focus score. The retrieved media can be obtained from advertisement repository 412. In some embodiments, the media can have a distraction score less than or equal to the focus score. In some embodiments, the media is selected based such that the associated distraction score does not exceed the safety threshold when combined with the focus score. In some embodiments, the media can be an advertisement. The advertisement can be selected based on data in driver profile 432.

Driver profile 432 can include information about one or more drivers of vehicle 420. In some embodiments, driver profile 432 can include a plurality of data for a driver. In some embodiments, driver profile 432 includes two or more profiles for two or more drivers. In some embodiments, driver profile 432 is based on vehicle 420. The profile can be shared for multiple vehicles. Each particular vehicle can have data unique to that vehicle 420. In some embodiments, driver profile 432 can include a skill level for the driver.

Historical data 434 can be data related to how one or more users interact with vehicle 420, different vehicles, and/or various media from advertisement repository 412. In some embodiments, historical data 434 includes driving history for each driver profile 432. The driver profile 432 can use data within historical data 434 to generate and/or update a skill level for the driver. In some embodiments, historical data 434 can be used to generate the distraction score and/or the focus score. For example, data regarding how the driver interacted with/was distracted by a previously displayed advertisement can be used to generate a future score. Another example, the frequency and/or recency of a driver being in a particular area can have an effect on the focus score.

Figure 5:
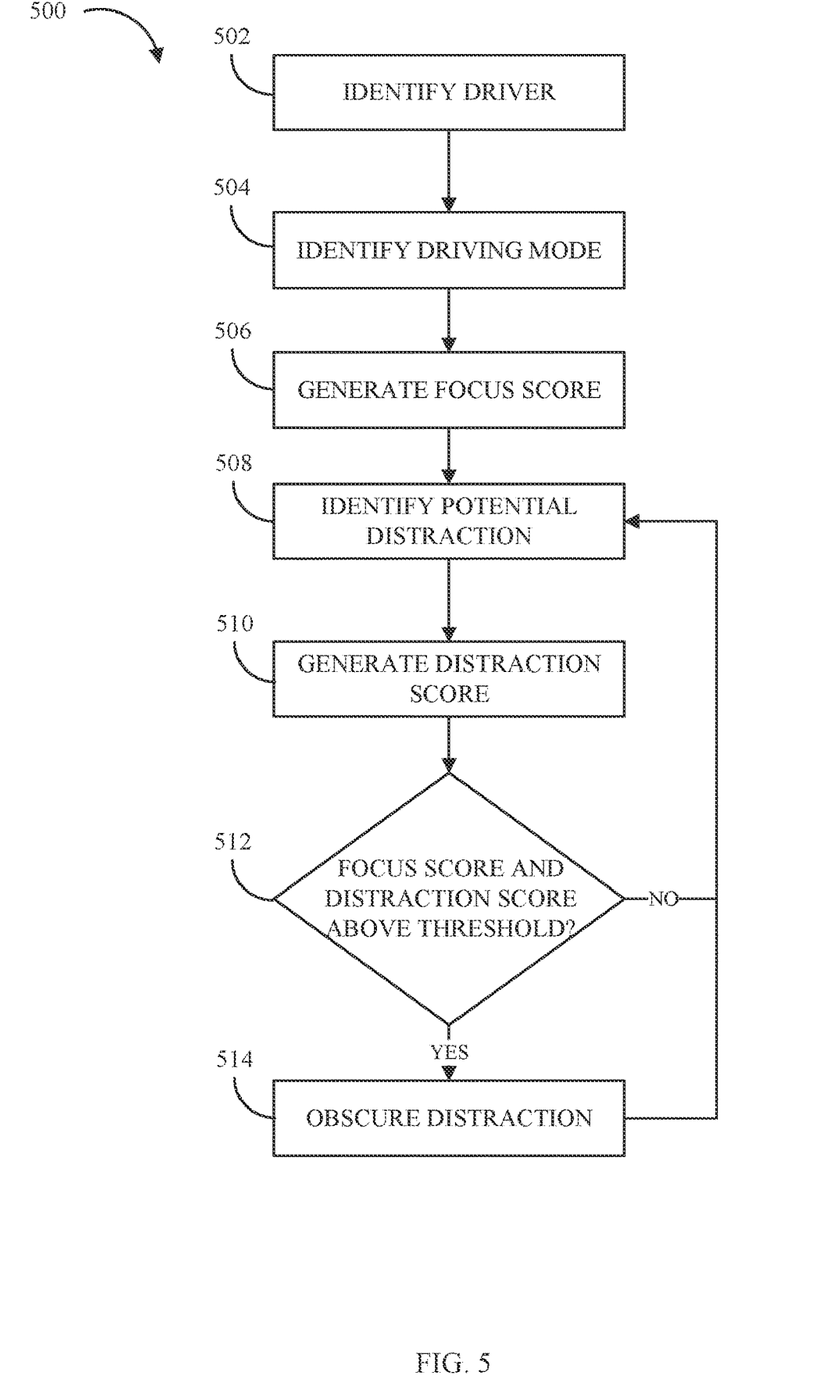
FIG. 5 illustrates a flow chart of an example method to obscure a distraction object while driving a vehicle, in accordance with some embodiments of the present disclosure.

FIG. 5 depicts a flowchart of an example method, method 500, for obscuring potential distractions based on a focus score that can be performed in a computing environment (e.g., computing environment 400 and/or cloud computing environment 50). One or more of the advantages and improvements described above for obscuring potential distractions may be realized by method 500, consistent with various embodiments of the present disclosure.

Method 500 can be implemented by one or more processors, host 410, vehicle 420, driving application 422, AR interface 424, sensors 426, display manager 430, driver profile 432, historical data 434, and/or a different combination of hardware and/or software. In various embodiments, the various operations of method 500 are performed by one or more of host 410, vehicle 420, driving application 422, AR interface 424, sensors 426, display manager 430, driver profile 432, and historical data 434. For illustrative purposes, the method 500 will be described as being performed by display manager 430.

At operation 502, display manager 430 identifies a driver. The driver can be a driver for a vehicle such as vehicle 420. In some embodiments, the driver is determined by receiving an input from the driver. The driver can select their driver profile 432 from a list of possible profiles. In some embodiments, the driver is determined based on one or more sensors

426. The sensors can determine which profile the driver is associated with. The sensors can be associated with one or more IoT devices in vehicle 420 and/or associated with the driver.

At operation 504, display manager 430 determines a driving mode. In some embodiments, the driving mode represents an automation level of the vehicle. Said differently, the driving mode is based on what portions of vehicle 420 are being controlled by the driver and controlled by driving application 422.

In some embodiments, the determines is based on driving application 422. The driving mode can be selected based on a predetermined set of modes. In some embodiments, each mode is associated with one or more features that are automated.

At operation 506, display manager 430 generates/calculates a focus score. In some embodiments, the focus score can represent an amount of attention the driver should put into driving. Said differently, the focus score can represent a minimum focus required to safely operate the vehicle. The minimum focus can be correlated with a maximum distraction factor. In some embodiments, the focus score can be represented as a number, a vector, and/or other similar representations. In some embodiments, the focus score is a number that is less than or equal to 1.

In some embodiments, the focus score is based on one or more the determined driving mode, driver experience level, location, environmental conditions, and the like. Each factor can have any weight in the score. In some embodiments, the driving mode is correlated to minimum focus score. If the vehicle is fully automated, then the focus score can be 0. In some embodiments, the focus score is based on driver experience level. For example, the less experience a driver has, the higher the focus score. The experience can be an overall experience, an experience related to conditions (e.g., driving in snow), and/or experience related to a location. For example, if a driver is an area they travel frequently, the focus score can be relatively lower than if in a new area.

In some embodiments, the focus score can be based on environmental conditions. Environment conditions can include weather, and/or traffic. For example, more traffic can require higher focus relative to low or no traffic. In some embodiments, the factors used in the focus score can be based on data in driver profile 432 and/or historical data 434.

At operation 508, display manager 430 identifies a potential distraction. In some embodiments, the distraction can be identified by sensors 426. The distraction can be any type of media (pictures, billboards), that are in the potential view of the driver. In some embodiments, the distractions can be located at predetermined positions. For example, a map of all billboards can be incorporated into display manager 430. The distraction can be identified by the vehicle passing the predetermined position.

At operation 510, display manager 430 generates/calculates a distraction score. The distraction score can represent a prediction of how much effort/attention the driver will give the distraction. The distraction score can be based on one or more of location, time of day, driver profile (e.g., interest), previous interactions, complexity of the distraction, and the like. As the likelihood that driver will give attention to the distraction increases, the distraction score increases. In some embodiments, the distraction score can be based on the complexity. The complexity can represent how much effort is required to incorporate the distraction. As an example, assume the distraction is a billboard. If the billboard only has a well-known logo, it will have a relatively low likelihood of drawing too much attention. The meaning can be obtained with a quick glance. If the billboard has several sentences and images and/or is new to the driver, it can take much longer to internalize the information. This will have a relatively high distraction score.

In some embodiments, the distraction score can be based on driver previous actions. For example, if the driver has been distracted by (interacted with) with a particular billboard in the past, the likelihood of the same or similar billboard being distracting increases. This can be based on data in historical data 434 and/or driver profile 432.

At operation 512 display manager 430 determines if the combination of the focus score and the distraction score exceed a predetermined threshold. The threshold can be a safety threshold. In some embodiments, display manager 430 combines the two scores together in some mathematical manner. The two score can be combined in any manner. In some embodiments, the threshold can represent a total attention for the user. The attention is being exceeded if the combination of scores exceeds the threshold. For example, if there is a low focus score, there is a potential for a larger distraction score before the threshold is exceeded. Vice versa if there is a high focus score, a relatively small amount of distraction can cause the threshold to be exceeded. If it is determined that the combination of the distraction score and the focus score is greater than the threshold, (512:YES), then display manager 430 proceeds to operation 514. If it is determined that the combination of the distraction score and the focus score is not greater (less than) than the threshold, (512:NO), then display manager 430 returns to operation 508 to identify a new distraction.

At operation 514, display manager 430 obscures the distraction. In some embodiments, the obscuring is performed by AR interface 424. In some embodiments, AR interface 424 can project an image to obscure the view of the distraction. In some embodiments, operation 514 can include changing an automation level. This can occur when obscuring in not feasible (e.g., obscure windshield). Increasing the automation level can decrease the focus score such that the driver is not distracted from tasks to perform. In response to completing operation 514, display manager 430 returns to operation 508 to identify a new potential distraction.

In some embodiments, display manager 430 continuously monitors for changes to a driver, a driving mode, and/or the focus score. In response to identifying a change in at least one of these factors, display manager 430 returns to the appropriate operation. For example, if a driver travels from an area that is familiar to them, to an unfamiliar area that can change the focus score, and display manager 430 can return to operation 506 and proceed with the remainder of method 500. This can continue until the car is no longer driving.

Figure 6:
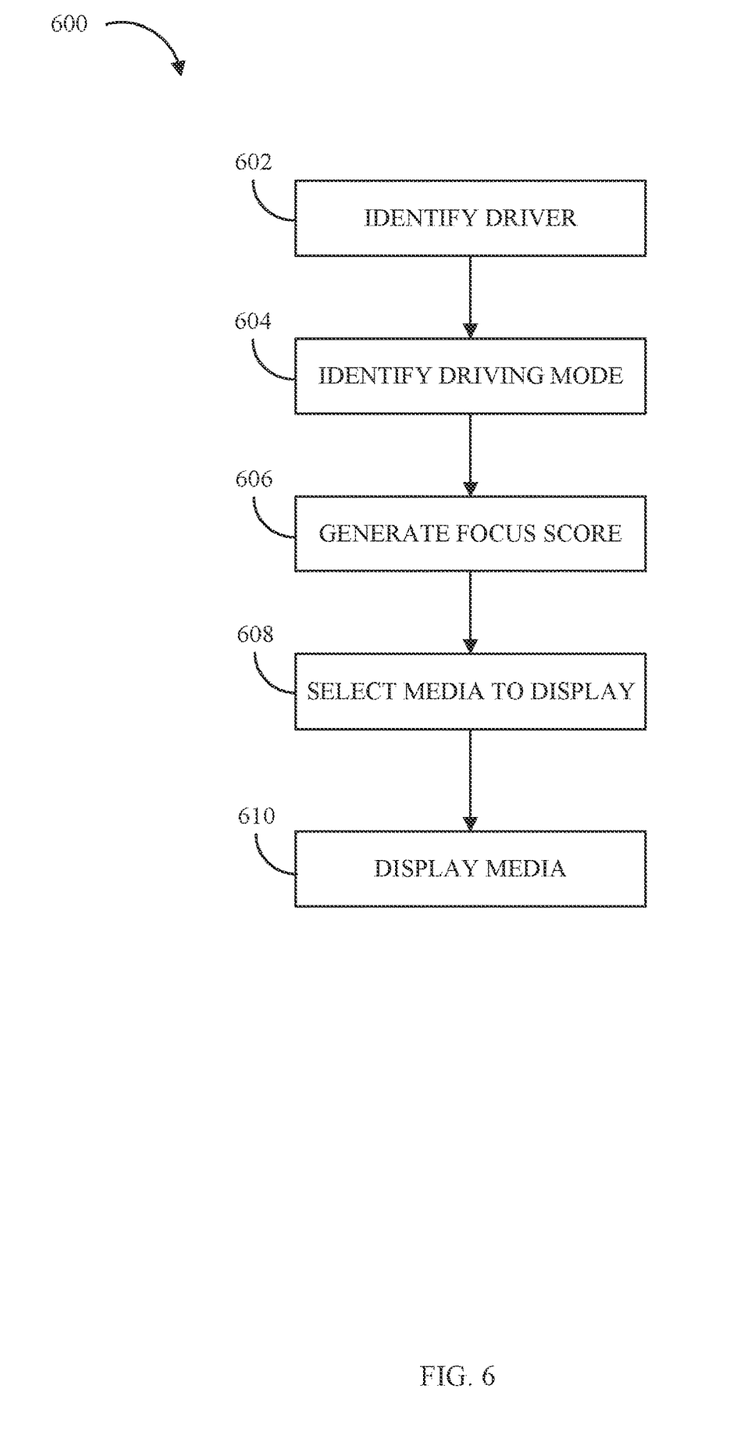
FIG. 6 illustrates a flow chart of an example method to display a media file below a determined distraction level, in accordance with some embodiments of the present disclosure.

FIG. 6 depicts a flowchart of an example method, method 600, for selecting media to display below a distraction threshold that can be performed in a computing environment (e.g., computing environment 400 and/or cloud computing environment 50). One or more of the advantages and improvements described above for selecting media to display below a focus threshold may be realized by method 600, consistent with various embodiments of the present disclosure.

Method 600 can be implemented by one or more processors, host 410, vehicle 420, driving application 422, AR interface 424, sensors 426, display manager 430, driver profile 432, historical data 434, and/or a different combination of hardware and/or software. In various embodiments, the various operations of method 500 are performed by one or more of host 410, vehicle 420, driving application 422, AR interface 424, sensors 426, display manager 430, driver profile 432, and historical data 434. For illustrative purposes, the method 600 will be described as being performed by display manager 430.

At operation 602, display manager 430 identifies a driver. At operation 604, display manager 430 determines a driving mode of the vehicle. AT operation 606, display manager 430 generates/calculates a focus score. In some embodiments, operations 602, 604, and 606 can be consistent with operation 502, 504, and 506 of method 500.

At operation 608, display manager 430 selects media to display. In some embodiments, the media can be an advertisement. In some embodiments, the media is requested and obtained from advertisement repository 412. The selection can be configured to maximize the distraction score such that the focus score and the distraction score do not exceed the threshold (or stay below the threshold). The lower the focus score, the more complex the media can be. In some embodiments, the selected media can be based on information in driver profile 432 and/or historical data 434.

In some embodiments, operation 608 includes selecting a time to display the media. The time can be based on a trigger. In some embodiments, operation 608 is in response to a trigger being activated. The trigger can be based on a location (e.g., predetermined locations), a time (e.g., time between displays), distance traveled, and the like.

At operation 610, display manager 430 displays the selected media. In some embodiments, the media is an advertisement. The media can be displayed by AR interface 424 on any suitable surface. In some embodiments, operation 610 includes storing relevant information in historical data 434 and/or driver profile 432. The relevant information can be related to the current focus and distraction scores, interaction with the displayed media, and other similar information. This can be used to generate future scores.

Computer Technology and Computer Readable Media:

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying a driver of a vehicle, wherein the vehicle includes an augmented reality (AR) system, and the vehicle is at least partially automated;
    determining a driving mode for the vehicle, wherein the driving mode indicates which driving functions of the vehicle are being controlled by a driving application of the vehicle;
    calculating a focus score, wherein the focus score represents a minimum focus required by the driver to operate the vehicle for the determined driving mode;
    requesting, from a media repository, a media file, wherein the media repository contains a plurality of media files and each media file has an associated distraction score, and the request is configured to maximize the distraction score;
    receiving from the media repository, a first media file to display, wherein a first distraction score of the first media file combined with the focus score is below a safety threshold; and
    displaying the first media file by the AR system.

2. The computer-implemented method of claim 1, wherein the driving mode is correlated to a minimum focus score.

3. The computer-implemented method of claim 2, wherein the focus score is further based on an experience level of the driver.

4. The computer-implemented method of claim 2, wherein the focus score is further based on environmental conditions surrounding the vehicle.

5. The computer-implemented method of claim 1, wherein the requesting is in response to an activation of a trigger.

6. The computer-implemented method of claim 1, wherein the requesting the media file include the focus score, and a maximum distraction score.

7. The computer-implemented method of claim 1, wherein the driving mode is selected from a predetermined set of driving modes.

8. The computer-implemented method of claim 7, wherein each driving mode of the set of driving modes is assigned to one level of a set of levels, and each level includes all functionality of a lower level with at least one additional automated feature of the vehicle.

9. The computer-implemented method of claim 1, wherein the focus score is a representation of a minimum amount of attention required of the driver for driving the vehicle.

10. The computer-implemented method of claim 1, wherein the first media file is an advertisement.

11. A system comprising:
    a processor; and
    a computer-readable storage medium communicatively coupled to the processor and storing program instructions which, when executed by the processor, are configured to cause the processor to:
        identify a driver of a vehicle, wherein the vehicle includes an augmented reality (AR) system, and the vehicle is at least partially automated;
        determine, a driving mode for the vehicle, wherein the driving mode indicates which functions of the vehicle are being controlled by the driver;
        calculate a focus score, wherein the focus score is based on the driving mode;
        identify a first distraction along a route the vehicle is traveling, wherein the first distraction is outside the vehicle;
        calculate a distraction score for the first distraction, wherein the distraction score is based on a complexity of the first distraction;
        determine a sum of the focus score and the distraction score exceed a safety threshold; and
        reduce a risk of the first distraction.

12. The system of claim 11, wherein the reduction of the risk include obscuring, by the AR system, the first distraction.

13. The system of claim 12, wherein the obscuring includes projecting an image on a window of the vehicle to obscure the first distraction.

14. The system of claim 11, wherein the reduction of the risk includes changing the driving mode of the vehicle.

15. The system of claim 14, wherein the driving mode is one of a set of driving modes and each driving mode of the set of driving modes is assigned to one level of a set of levels, and each level includes all functionality of a lower level with at least one additional automated feature of the vehicle.

16. The system of claim 15, wherein the change of the driving mode is to a higher level of the set of levels.

17. The system of claim 16, wherein the change of the driving mode causes a reduction in the focus score, such that the sum of the focus score and the distraction score decrease below the safety threshold.

18. A non-transitory computer program product, the computer program product comprising a computer readable storage medium having program instructions embodied therewith, the program instructions executable by a processing unit to cause the processing unit to:
- identify a driver of a vehicle, wherein the vehicle includes an augmented reality (AR) system, and the vehicle is at least partially automated;
- determine, a driving mode for the vehicle, wherein the driving mode indicates which driving functions of the vehicle are being controlled by a driving application of the vehicle;
- calculate a focus score, wherein the focus score represents a minimum focus required by the driver to operate the vehicle for the determined driving mode;
- request, from a media repository, a media file, wherein the media repository contains a plurality of media files, and each media file has an associated distraction score, and the request is configured to maximize the distraction score;
- receive from the media repository, a first media file to display, wherein a first distraction score of the first media file combined with the focus score is below a safety threshold; and
- display the first media file by the AR system.

19. The computer program product of claim 18, wherein the request for the media file includes the focus score, and a maximum distraction score.

20. The computer program product of claim 19, wherein the focus score is further based on an experience level of the driver, the focus score is further based on environmental conditions surrounding the vehicle, and the maximum distraction score represents a complexity of the first media file.

* * * * *